United States Patent [19]

Bober et al.

[11] Patent Number: 4,617,003

[45] Date of Patent: Oct. 14, 1986

[54] ADJUSTABLE FRICTION CLUTCH ASSEMBLY

[75] Inventors: Helmut Bober, Neunkirchen; Theo Buthe, Lohmar; Karl Coenen, Hennef; Norbert Fartmann, Siegburg; Klaus Herbertz, Lohmar; Heinz Koch, Hennef; Horst Kretschmer, Colonge; Clemens Nienhaus, Lohmar; Peter Schardt, Neunkirchen; Jürgen Schibrowski, Lohmar; Willi Schmandt, Siegburg, all of Fed. Rep. of Germany

[73] Assignee: Jean Walterscheid GmbH, Lohmar, Fed. Rep. of Germany

[21] Appl. No.: 735,838

[22] Filed: May 20, 1985

[30] Foreign Application Priority Data

May 18, 1984 [DE] Fed. Rep. of Germany ....... 3418558

[51] Int. Cl.⁴ ................................................ F16D 7/02
[52] U.S. Cl. .................................... 464/48; 192/56 R
[58] Field of Search ................ 192/56 R; 464/45, 46, 464/47, 48

[56] References Cited

U.S. PATENT DOCUMENTS 4,501,570  2/1985  Konrad .................................. 464/48

FOREIGN PATENT DOCUMENTS 537604    5/1959  Belgium ................................. 464/46
53909     5/1934  Norway ................................. 464/48
1021379   3/1966  United Kingdom .................. 464/48
690208   10/1979  U.S.S.R. ................................ 464/46

Primary Examiner—Stuart S. Levy
Assistant Examiner—Daniel P. Stodola
Attorney, Agent, or Firm—Toren, McGeady, Stanger, Goldberg & Kiel

[57] ABSTRACT

A clutch assembly capable of providing several predetermined settings, wherein the components which support springs applying torque are not subjected to bending loads. The settings are achieved in that a supporting ring supporting a pressure plate against a clutch housing is provided with radially outwardly extending cams which are offset relative to the center thereof with two rows of apertures being provided in a cylindrical face of the clutch housing which are axially offset and offset relative to the angle of rotation and which correspond to the cams of the supporting ring and within which the cams are engaged.

3 Claims, 6 Drawing Figures

ADJUSTABLE FRICTION CLUTCH ASSEMBLY

The present invention relates generally to adjustable friction clutches and particularly to clutch assemblies which are especially useful in drive lines for connecting an agricultural implement with the power takeoff shaft of a tractor.

Clutch assemblies of the type to which the present invention relates generally may consist of a clutch hub and a dish-shaped clutch housing which comprise the first and second clutch parts of the assembly. Intermediate plates are arranged between the two clutch parts and the plates are alternately nonrotatively connected to one of the two clutch parts. Between the plates, provision is made for annular friction linings and axially acting pressure springs are provided. The springs are arranged so that one end thereof acts against the friction assembly consisting of the intermediate plates and the annular friction linings with the other end of the springs being held in a pressure plate supported on stops of the friction housing.

In the prior art, particularly U.S. Pat. No. 4,501,570, there is known an adjustable friction clutch having a radially outwardly extending adjusting ring with brackets which form an equidirectional angle with the clutch axis and which are supported on stops of the housing. A prior art construction of this type gives rise to disadvantages in that due to the provision of beads, the housing is very expensive to produce. A further disadvantage consists in the fact that if, after opening the clutch for cleaning purposes, for example, the previous clutch setting is not marked or indicated in any other way, there arises the risk that the friction clutch may be reassembled and set to a wrong torque setting. A further disadvantage arises in that the adjusting ring effecting the clutch setting changes its position as a result of vibrations which always occur when connected with drive shafts.

Accordingly, the present invention is directed toward providing an adjustable friction clutch assembly which is designed to have several predetermined settings and wherein the components which support the springs applying the torque are not subjected to bending loads.

SUMMARY OF THE INVENTION

In the clutch assembly of the present invention, there is provided a clutch hub which consists of a first clutch part and a dish-shaped clutch housing which consists of a second clutch part. A friction assembly placing the first and second clutch parts in torque transmitting engagement consists of intermediate plates arranged between the clutch parts for being alternately nonrotatingly connected to one of the clutch parts and annular friction linings provided between the intermediate plates. A pressure plate is supported on stops formed on the clutch housing and axially acting pressure springs are engaged between the friction assembly and the pressure plate. A supporting ring which operates to support the pressure plate against the clutch housing has formed thereon radially outwardly extending cams which are axially offset toward the center thereof and two rows of apertures are provided on a cylindrical face of the clutch housing within which the outwardly extending cams engage, the two rows of apertures being axially offset and offset relative to the angle of rotation and corresponding to the cams of the supporting ring.

The benefits and objectives of the invention are achieved in that: the pressure plate is supported against the clutch housing via the supporting ring; the supporting ring has been provided with the radially outwardly extending cams axially offset toward the center; and the cylindrical face of the clutch housing has been provided with two rows of apertures which are axially offset and offset relative to the angle of rotation and which correspond to the cams of the supporting ring.

The advantage of a structure in accordance with the present invention is that the supporting ring holding the pressure plate rests directly against the inner wall of the clutch housing. As a result, the radially outwardly extending cams are subjected to shear loads only and not to bending loads.

The design of the invention ensures that even with long term operation, the clutch will maintain its preset nominal torque.

Since, due to the center offset of its radially outwardly pointing cams, the supporting ring has two settings and since the housing also has two settings, due to the two rows of apertures corresponding to the cams of the supporting ring, there is a total of four settings for the nominal torque of the friction clutch.

In a preferred embodiment of the invention, at the end of the pressure plate pointing to the supporting ring, provision is made for uniformly circumferentially distributed, axially projecting first supporting cams.

In this design, the pressure plate and its cams extending toward the supporting ring simultaneously protect the supporting ring from escaping radially inwardly and the clutch from any unintentional opening.

In accordance with a further advantageous feature of the invention, at the end of the pressure plate facing the pressure springs, on either side of the bores, for the purpose of receiving stud bolts holding the pressure springs, provision has been made for two further supporting cams on a circular arch opposite the bores in such a way that they are radially offset toward the outside.

These further supporting cams operate to provide the function of protecting the pressure springs from being displaced from the pressure plate stop so that further spring receiving means will not be necessary.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
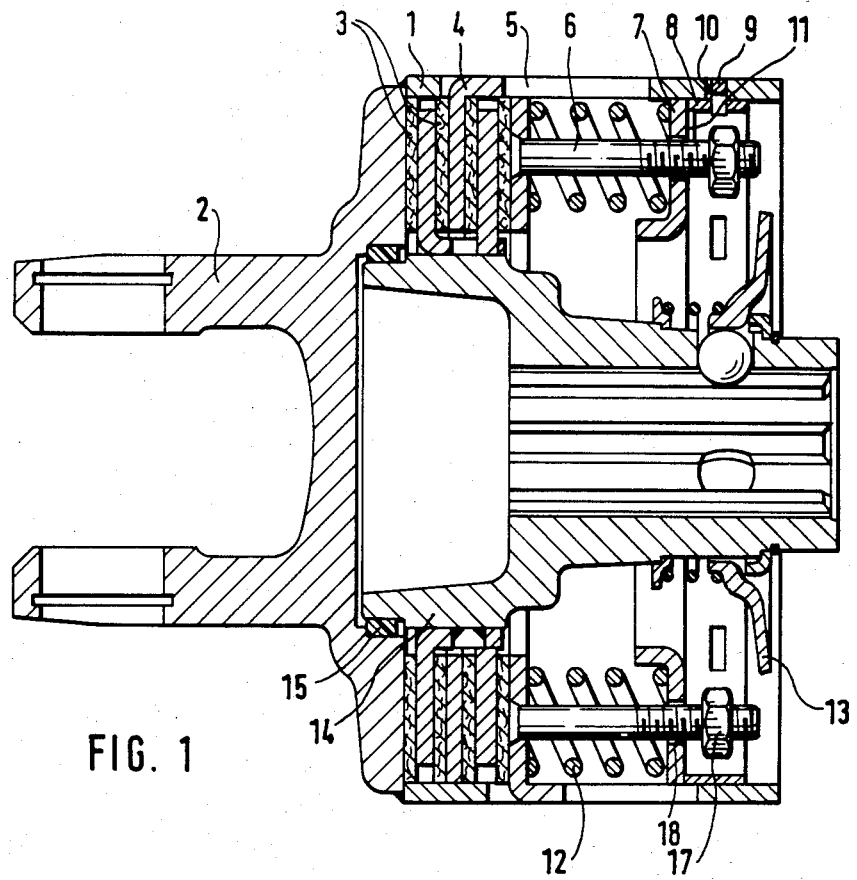
FIG. 1 is a longitudinal sectional view showing a clutch assembly in accordance with the present invention.

Referring now to the drawings and particularly to FIG. 1, there is shown an adjustable friction clutch assembly in accordance with the present invention which consists essentially of a clutch hub 14 upon which a clutch housing 1 is rotatably supported. A joint yoke 2 is nonrotatingly connected to the clutch housing 1 in order to transmit torque via a drive shaft. Intermediate plates 4 are alternately connected to the clutch housing 1 and to the clutch hub 14 so as to be nonrotating, but axially movable. Between the intermediate plates 4, provision is made for annular friction linings 3.

The intermediate plates 4 which are nonrotatingly connected to the clutch housing are guided in windows 5 of the clutch housing 1.

Pressure springs 12 for producing the normal force applying torque are partly arranged on stud bolts 6. At one end of the springs 12, they are supported on the friction assembly consisting of the intermediate plates 4 and the friction linings 3 and at the other end of the springs 12, they are supported against a pressure plate 7. The pressure plate 7 is, in turn, supported toward the open end of the clutch housing 1 on a supporting ring 8 which is provided with radially outwardly extending cams 9. The clutch housing 1 is formed with apertures 10 which correspond with the cams 9 and into which the cams 9 engage.

In order to enable change of the predetermined settings of the clutch, the stud bolts 6 have been provided with nuts 17 by means of which the springs 12 can be compressed via the pressure plate 7 in such a manner that the supporting ring 8 can be removed from its secured position and refitted laterally reversed. This results in a change in the spring tension due to the center offset of the radially outwardly extending cams 9, or the supporting ring 8 may be inserted into a further row of apertures 10 in the clutch housing 1, which also results in a change in the spring tension.

Figure 2:
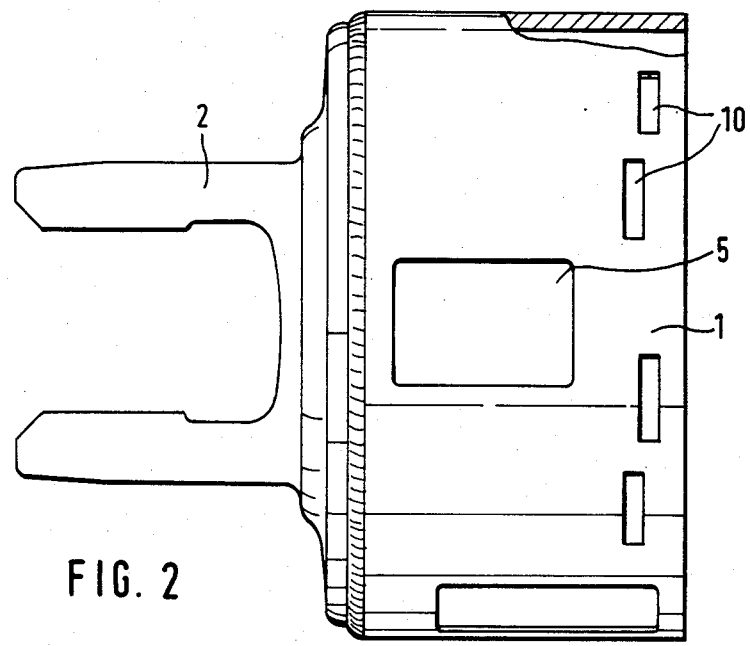
FIG. 2 is a plan view of the clutch housing of the invention.

FIG. 2 shows the clutch housing with two axially offset rows of apertures 10 which correspond to the radially outwardly extending cams 9 of the supporting ring 8.

Figure 3:
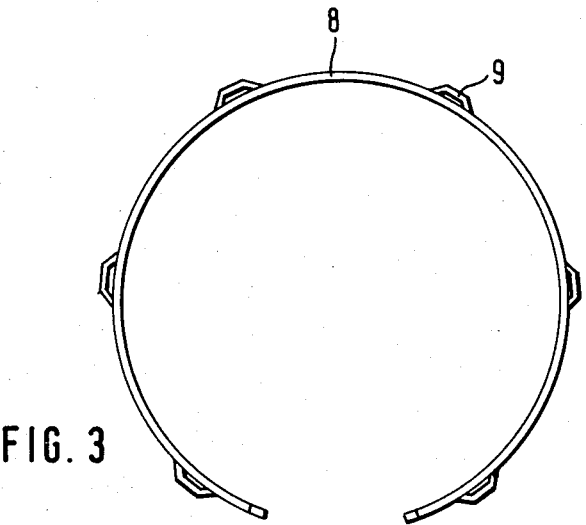
FIG. 3 is a plan view of an intermediate ring forming part of the assembly of the invention.

FIG. 3 shows the supporting ring 8 having the radially outwardly extending cams 9.

Figure 4:
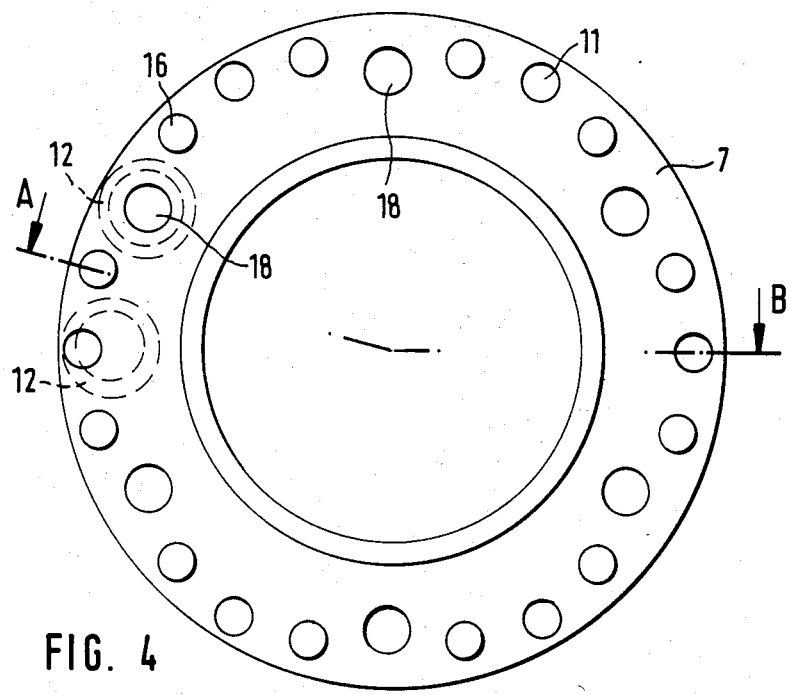
FIG. 4 is a plan view of a pressure plate formed in the assembly of the invention.
Figure 5:
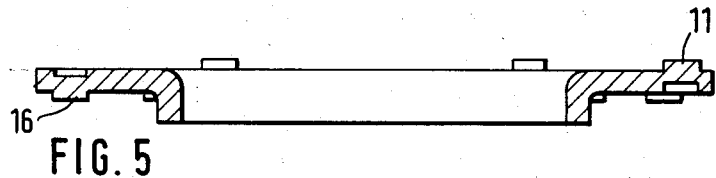
FIG. 5 is a sectional view of the pressure plate taken along the line A-B of FIG. 4.

FIG. 4 is a plan view of the pressure plate 7 having the supporting cams 11 extending axially in the direction of the supporting ring 8. Additionally, further supporting cams 16 are provided which point in the direction of the pressure springs. Whereas the first supporting cams 11, as can be seen in FIG. 1, secure the supporting ring 8 radially outwardly, the further supporting cams 16 associated with bores 18 for the stud bolts 6, have the function of securing those pressure springs 12 not arranged on stud bolts 6 on the pressure plate 7 against displacement.

Figure 6:
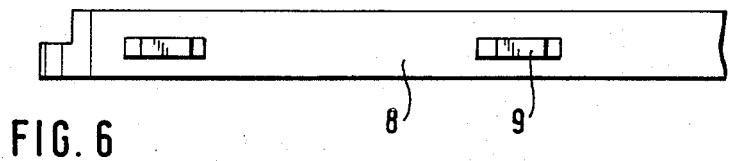
FIG. 6 is a partial view or developed view of the supporting ring of the assembly.

FIG. 6 shows the supporting ring 8 in a partially developed view indicating the axial offset of the radially outwardly extending cams 9 relative to the axial center of the supporting ring.

Due to the combination of the axial center offset of the radially outwardly extending cams 9 of the supporting ring 8 and the arrangement of two rows of apertures 10 at the clutch housing 1 which are axially offset relative to each other, four settings are obtained for changing the prestress of the springs 12 and thus the clutch torque.

With a predetermined basic clutch setting, for example, the stops can be combined in such a way that the clutch can be set toward a higher torque only or, if so desired, to a lower torque only. Alternatively, it can be produced by the manufacturer in such a way that there is a limited adjusting possibility both toward a higher torque and toward a lower torque.

While a specific embodiment of the invention has been shown and described in detail to illustrate the application of the inventive principles, it will be understood that the invention may be embodied otherwise without departing from such principles.

What is claimed is:

1. An adjustable friction clutch assembly, especially suitable for use in drive lines for connecting an agricultural implement with a power takeoff shaft of a tractor, comprising:
   a clutch hub consisting of a first clutch part;
   a dish-shaped clutch housing consisting of a second clutch part;
   a pressure plate;
   a friction assembly for placing said first and second clutch parts in torque transmitting engagement, said friction assembly comprising intermediate plates arranged between said clutch parts for being alternately nonrotatingly connected to one of said clutch parts and annular friction linings provided between said intermediate plates;
   axially acting pressure springs having one end acting on said friction assembly and an opposite end held in said pressure plate;
   a supporting ring operating to support said pressure plate against said clutch housing;
   radially outwardly extending cams provided on said supporting ring axially offset from the center thereof; and
   two rows of apertures provided on a cylindrical face of said clutch housing within which said outwardly extending cams engage, said two rows of apertures being axially offset and offset relative to the angle of rotation and corresponding to said cams of said supporting ring;
   said axially offset cams being selectively engageable with said axially offset apertures to enable adjustment of the spring force of said clutch assembly.

2. An assembly according to claim 1, wherein at an end of said pressure plate pointing to said supporting ring provision is made for uniformly circumferentially distributed axially projecting first supporting cams engaged by said supporting ring to support said supporting ring relative to said pressure plate.

3. An assembly according to claim 2, further comprising stud bolts holding said pressure springs in operative position, bores in said pressure plate for receiving said stud bolts and further supporting cams at the end of said pressure plate facing said pressure springs on either side of said bores, said assembly comprising additional pressure spring supported on said further supporting cams, said further supporting cams being formed on a circular arc opposite said bores in such a way that they are outwardly radially offset.

* * * * *